(12) United States Patent
Wang

(10) Patent No.: US 7,958,776 B2
(45) Date of Patent: Jun. 14, 2011

(54) ATOMIC FORCE GRADIENT MICROSCOPE AND METHOD OF USING THIS MICROSCOPE

(76) Inventor: Chunhai Wang, Ventura, CA (US)

( * ) Notice: Subject to any disclaimer, the term of this patent is extended or adjusted under 35 U.S.C. 154(b) by 868 days.

(21) Appl. No.: 11/899,571

(22) Filed: Sep. 6, 2007

(65) Prior Publication Data
US 2009/0064772 A1 Mar. 12, 2009

(51) Int. Cl.
*G01B 7/34* (2006.01)
(52) U.S. Cl. .......................... 73/105; 116/275
(58) Field of Classification Search .............. 73/105; 116/275
See application file for complete search history.

(56) References Cited

U.S. PATENT DOCUMENTS

| | | | |
|---|---|---|---|
| 4,343,993 A | 8/1982 | Binnig et al. | |
| 4,724,318 A | 2/1988 | Binnig et al. | |
| 4,935,634 A | 6/1990 | Hansma et al. | |
| 5,254,854 A * | 10/1993 | Betzig | 250/234 |
| 5,308,974 A | 5/1994 | Elings et al. | |
| 5,345,815 A | 9/1994 | Albrecht et al. | |
| 5,412,980 A | 5/1995 | Elings et al. | |
| 5,436,448 A * | 7/1995 | Hosaka et al. | 850/1 |
| 5,517,128 A * | 5/1996 | Henninger | 324/765 |
| 5,681,987 A * | 10/1997 | Gamble | 73/105 |
| 5,874,669 A * | 2/1999 | Ray | 73/105 |
| 5,907,096 A * | 5/1999 | Chen | 73/105 |
| 5,918,274 A * | 6/1999 | Chen et al. | 73/105 |
| 5,925,818 A * | 7/1999 | Cleveland et al. | 73/105 |
| 5,955,660 A | 9/1999 | Honma | |
| 6,005,246 A | 12/1999 | Kitamura et al. | |
| 6,134,955 A | 10/2000 | Han et al. | |
| 6,148,662 A | 11/2000 | Lin | |
| 6,167,753 B1 * | 1/2001 | Chen et al. | 73/105 |
| 6,220,084 B1 * | 4/2001 | Chen et al. | 73/105 |
| 6,583,411 B1 * | 6/2003 | Altmann et al. | 850/4 |
| 6,596,992 B2 | 7/2003 | Ando et al. | |
| 6,753,664 B2 * | 6/2004 | Neufeld et al. | 318/116 |
| 6,798,226 B2 * | 9/2004 | Altmann et al. | 324/754 |
| 7,194,897 B2 | 3/2007 | Lee et al. | |
| 7,234,343 B2 * | 6/2007 | Ducker et al. | 73/105 |
| 7,521,257 B2 * | 4/2009 | Adams et al. | 436/183 |

OTHER PUBLICATIONS

G. Binnig, et al., "Atomic Force Microscope", Physical Review Letters, Mar. 3, 1986, pp. 930-933, vol. 56, No. 9, Edward L. Giszlon Laboratory, Stanford University, Calif.
Y. Martin, et al., "Atomic force microscope-force mapping and profiling on a sub 100-Å scale", J. Appl. Phys. 61 (10), May 15, 1987, pp. 4723-4729, Yorktown Hts., NY.
Ahmet O. et al. "Quantitative atom-resolved force gradient imaging using noncontact atomic force microscopy", Applied Physics Letters, Sep. 17, 2001, pp. 1915-1917, vol. 79, #17.
D. Rugar, et al., "Improved fiber-optic interferometer for atomic force microscopy", Appl.Phys.Lett.55 (25), Dec. 18, 1989, pp. 2588-2590, Almaden Res.Ctr., San Jose, CA.
S. P. Jarvis, et al., "A novel force microscope and point contact probe", Rev. Sci. Instrum. 64 (12), Dec. 1983, pp. 3515-3520, Oxford, UK.
T. R. Albrecht, et al., "Frequency modulation detection using high-Q cantilevers for enhanced force microscope sensitivity", J. Appl. Phys. 69 (2), Jan. 15, 1991, pp. 668-673, CA.
Franz J. Giessibl, "Advances in atomic force microscopy", Rev. Mod. Phys., vol. 75, No. 3, Jul. 2003, pp. 949-983, Augsburg Univ., Augsburg, Germany.

* cited by examiner

*Primary Examiner* — Hezron Williams
*Assistant Examiner* — Rodney T Frank
(74) *Attorney, Agent, or Firm* — Patrick Bright

(57) ABSTRACT

A scanning probe microscope in which the probe is oscillated at a frequency lower than its resonant frequency, a force sensor that is sensitive to the bending of the cantilever and minimally sensitive to the oscillation is used to measure tip-sample interaction force. The sensor signal is then converted to a force gradient signal by electronics. The gradient signal is kept constant by a feedback mechanism as the tip is scanned across the surface of a sample, and force and topographical information are mapped.

20 Claims, 5 Drawing Sheets

ATOMIC FORCE GRADIENT MICROSCOPE AND METHOD OF USING THIS MICROSCOPE

FIELD OF THE INVENTION

The present invention is directed to scanning probe microscopes (SPMs), and more particularly, to an atomic force gradient microscope (AFGM) employing force gradient for feedback control while other properties of a sample, such as topography, are measured.

DESCRIPTION OF RELATED ART

Scanning probe microscopes (SPMs) refer to a group of instruments that obtain the image of a surface by mechanically scanning a sharp tip over the surface, recording the probe-surface interaction as a function of position. Most commonly used scanning probe microscopes include the Scanning Tunneling Microscope (STM) as described in U.S. Pat. No. 4,343,993 by Binnig et al and the Atomic Force Microscope (AFM) as described in U.S. Pat. No. 4,724,318 by Binnig et al.

In an STM, an electronic current, known as the tunneling current, is used to control a probe tip to track the surface of a sample. This tunneling current is produced in response to a bias voltage applied between the tip and conducting sample. It is sensitive to the tip-sample separation distance. During operation, maintaining a constant tunneling current through the use of the feedback loop gives a generally constant separation of the tip above the sample surface. The feedback signal itself is indicative of topography of the sample. Since tunneling current is used, an STM requires the sample to be conductive.

In an AFM, the feedback mechanism varies depending on the operating mode. In a mode of operation called contact mode, the probe is maintained in continuous contact with the sample. This is accomplished by a feedback system, which moves either the sample or the probe relatively perpendicularly to the surface of the sample in response to the deflection of the cantilever of the probe assembly as it is scanned across the sample surface. In this way, the data associated with each point are stored and used to construct an image of the sample surface corresponding to the sample characteristic being measured, e.g., surface topography. The limitation of contact mode is its strong lateral and compressive force generated as the tip is scanned across a sample. The force can easily damage soft samples, such as biological cells and certain polymers.

In another mode of AFM operation, known as intermittent or tapping mode, as described in U.S. Pat. No. 5,412,980 by Elings et al., the tip periodically contacts the sample as the tip is oscillated at or near a resonant frequency of the associated cantilever of the probe. If the separation between the tip and the sample changes, the amplitude and phase change accordingly in response to the tip-sample interaction. During scanning, the amplitude or phase of this oscillation is kept constant through a feedback mechanism, which moves the tip or the sample relative to one other in response to tip-sample interaction. Similar to the contact mode, the data associated with each point are collected, stored and used to characterize the sample. Tapping mode is the most popular operating mode since it virtually eliminates the lateral force and allows more delicate samples to be imaged. However, the tapping force is still considered to be excessive for some soft samples. As a result, its resolution for a soft sample is far worse than for a hard sample. For example, the tapping force microscope is ineffective in resolving the profiles of larger biomolecules, such as DNA. It cannot resolve the subunits of these molecules, such as nucleotide, or biomolecules on soft substrate, such as native membrane proteins.

In another mode of AFM operation, known as non-contact mode, the tip is scanned in the proximity of a sample, and weak Van Der Waals attractive force between tip and sample are sensed for feedback control. As the tip is brought to the sample surface, the negative force gradient of Van Der Waals force acts on the cantilever, changing the effective spring constant and thus shifting the resonant frequency of the cantilever. The shift may be measured directly by the method proposed by Albrecht et al, *J. Appl. Phys.* 69 (2), 15 Jan. 1991, pp. 668-673, or indirectly by the method described by Martin et al in J. Appl. Phys. 61 (10), 15 May 1987, pp. 4723-4729. In the direct method, the cantilever is excited at its resonant frequency. The frequency is measured directly and kept constant through a feedback. This technique is also referred to as frequency modulation (FM). FM requires a high-Q factor to stabilize quickly. It is mainly used in vacuum. Atomic resolution has been reported with this technique. In the indirect method, the cantilever is oscillated at a fixed frequency, which is usually near or at the resonant frequency. When the gradient of Van Der Waals force shifts the resonant frequency closer to or further from the excitation frequency, the amplitude of oscillation will increase or decrease accordingly. The amplitude, which is indicative of resonant frequency, is measured and kept constant during scanning. Different from frequency modulation, amplitude modulation requires sufficient damping in order to settle quickly. It is suitable for use in air.

Amplitude modulation typically operates at or close to the resonant frequency of the probe cantilever. Off-resonance modulation has also been explored by some researchers. Ando et al. disclosed a method to operate an AFM in U.S. Pat. No. 6,596,992, wherein the probe is oscillated at a frequency different from the resonant frequency. The purpose is to damp the transient response of the cantilever. The amplitude is measured and used for feedback control during scanning. Ahmet Oral et al. described another setup in Appl. Phys. Lett., 79(12), 17 Sep. 2001, pp. 1915-1917, wherein the tip is oscillated below the resonant frequency. The amplitude was measured to characterize surface properties of the surface; electronic tunneling current was used for feedback control during scanning.

Amplitude modulation is a widely used technique in AFM because of the low interaction force and the ability to operate in ambient environment. However the technique has limitations. First, the relation between the amplitude and interaction force, whether operated on- or off-resonance modulation, is not linear. It is difficult to relate the amplitude directly to interaction force. Second, the amplitude, if operated on resonance, is susceptible to ambient damping in addition to tip-sample interaction force. For example, the damping between the cantilever and the sample affects the amplitude. As the probe approaches the surface of a sample, the amplitude decreases before the tip enters effective atomic force region due to the increase in damping, as illustrated in FIG. 1. As a result, it is difficult to predict the interaction force by presetting the amplitude. If the preset value is too high, the tip may not track the surface. If too low, the interaction force may be too excessive, which could damage a sample. It requires considerable training and experience for an operator to operate properly. Third, it is hard to operate on-resonance modulation in liquid. Since the damping is strong in liquid, the resonant peak of a cantilever is often difficult to distinguish from unrelated peaks from other mechanical structures, making identification of resonant frequency difficult.

Another limitation of AFM technique is that it requires two scans to do force mapping. Since the force signal has already been used in AFM for feedback control, it is impossible to do force mapping while keeping the feedback on. A two-scan method is proposed in U.S. Pat. No. 5,308,974 to deal with the problem. The first scan measures topographical information with the feedback on, and the second scan maps force distribution while the probe is positioned using stored topographical information obtained in the first scan. Two-scan technique reduces productivity, and is susceptible to thermal drift, affecting lateral resolution.

SUMMARY OF THE INVENTION

Accordingly, one object of this invention is to provide novel scanning probe microscopes and methods that are more powerful, reliable and easier to use than earlier AFM's.

A further object of the invention is to provide novel scanning probe microscopes and methods that can be operated in non-contact mode and used for imaging extremely soft samples in air and liquid.

It is another object of the invention to provide novel scanning probe microscopes and methods that allow force mapping to be done in one scan, improving imaging accuracy and productivity.

It is another object of the invention to provide novel scanning probe microscopes and methods that can be used for distinguishing different chemicals on a surface by measuring onset bonding force formed between the tip and the surface.

These and other objects are achieved according to the present invention by providing an atomic force gradient microscope (AFGM) and method of operating it, wherein the probe is oscillated below its resonant frequency, e.g., below the resonant region as defined by Full Width at Half Maximum (FWHM), atomic force is measured from the bending of cantilever, and atomic force gradient, or the rate of change in atomic force, is extracted from the force signals. Feedback is employed to maintain the force gradient constant. The feedback control signal may be used to map surface topography, and the force signal be used for force mapping. The invention may be used for characterizing soft biological samples, mapping magnetic force, identifying chemical distributions on the surface of a sample, and other applications for which existing AFM's are used.

BRIEF DESCRIPTION OF THE DRAWINGS

The invention can better be understood by reference to the drawings, which provide exemplary embodiments of the new SPM's, but are not the only feasible embodiments, and in which.

DETAILED DESCRIPTION OF THE PREFERRED EMBODIMENTS

Figure 1:
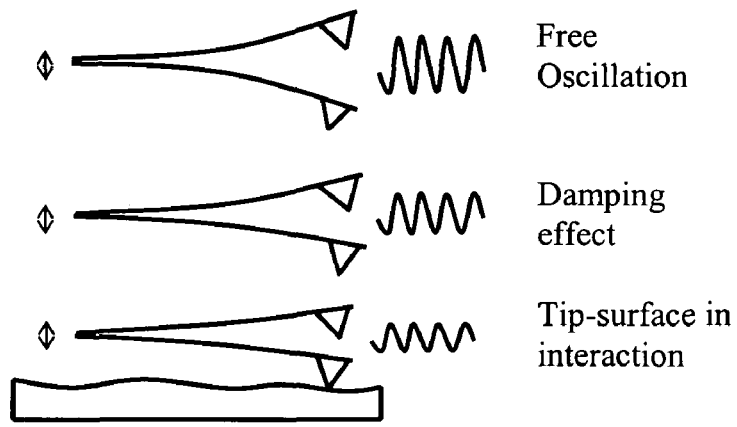
FIG. 1 shows that, as an SPM probe approaches the surface of a sample, the amplitude of the probe decreases before the tip enters effective atomic force region due to the increase in damping.
Figure 2:
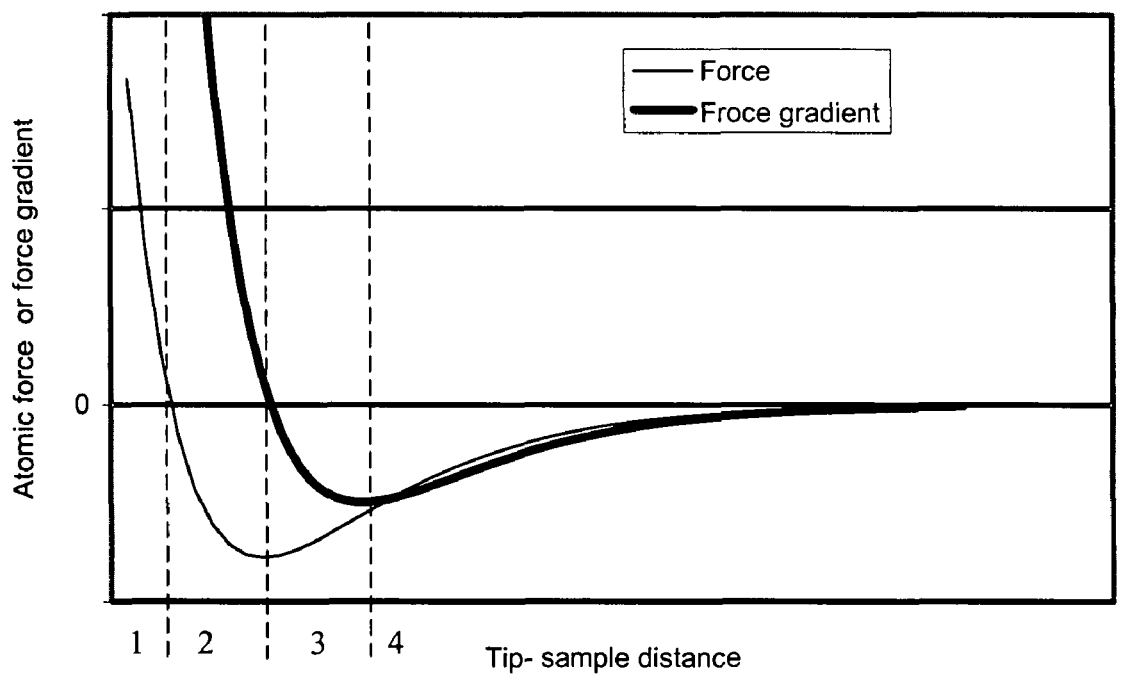
FIG. 2 shows a typical atomic force gradient curve (thicker line) and a typical corresponding force curve (thinner line) from an AFGM.

AFGM is based on atomic force gradient curve as a function of tip-sample distance, and the gradient is used in a feedback system to keep a probing tip tracking the surface of a sample. FIG. 2 shows a typical atomic force gradient curve (thicker line) and corresponding force curve (thinner line). The force gradient curve starts (from right to left) at values close to zero as the tip begins to approach the sample. The gradient curve turns negative as the cantilever enters a Van Der Waals attractive force region. As short-range repulsive force phases in, the gradient curve pulls up from the negative bottom and rises to the positive region. The gradient curve can be divided into four zones. In zones 1 and 2, the atomic force gradient is positive and unique, satisfying the condition for stable feedback. Zones 1 and 2 are the optimum regions to operate an AFGM by keeping the force gradient signal constant through feedback. In zone 1, the atomic force is also positive, indicating that the tip is in contact with the sample. This operating mode is referred to as contact mode. In zone 2, the force curve is negative, indicating that the tip is not in contact with the sample. The operating mode is referred to as non-contact mode. In zones 3 and 4, the atomic force is also negative, indicating that these zones are in the non-contact region too. However, the force gradient is not monotonous with each value having two corresponding positions in tip-sample distance. As a result, the AFGM, if operating in zones 3 or 4, may result in tip hopping between the two positions. Such operations are only feasible in a well-controlled environment, e.g., in a vacuum, where the position hopping due to vibration is minimized.

Figure 3:
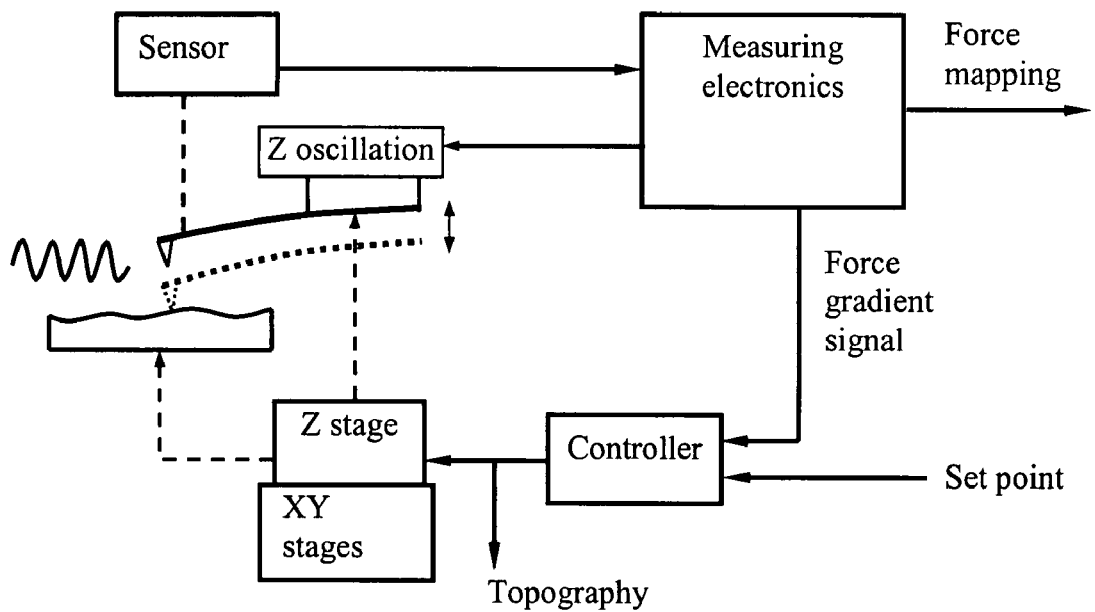
FIG. 3 shows a schematic diagram of an AFGM embodiment.

According to the invention, an AFGM, as shown in FIG. 3, comprises a cantilever having a small tip at one end, an oscillator to periodically oscillate the cantilever in z direction at a frequency lower than its resonant frequency, a sensor that detects the bending of the cantilever resulting from the interaction force between the probe tip and the sample, measuring electronics that generate force and force gradient information from sensor signal and drive oscillation of the cantilever, a controller that drives the motion of the sample or the probe in accordance with the difference between set point and measured force gradient, and XYZ stages that move either the tip or the sample in z direction and scan at least one of them in x, y directions.

Figure 4:
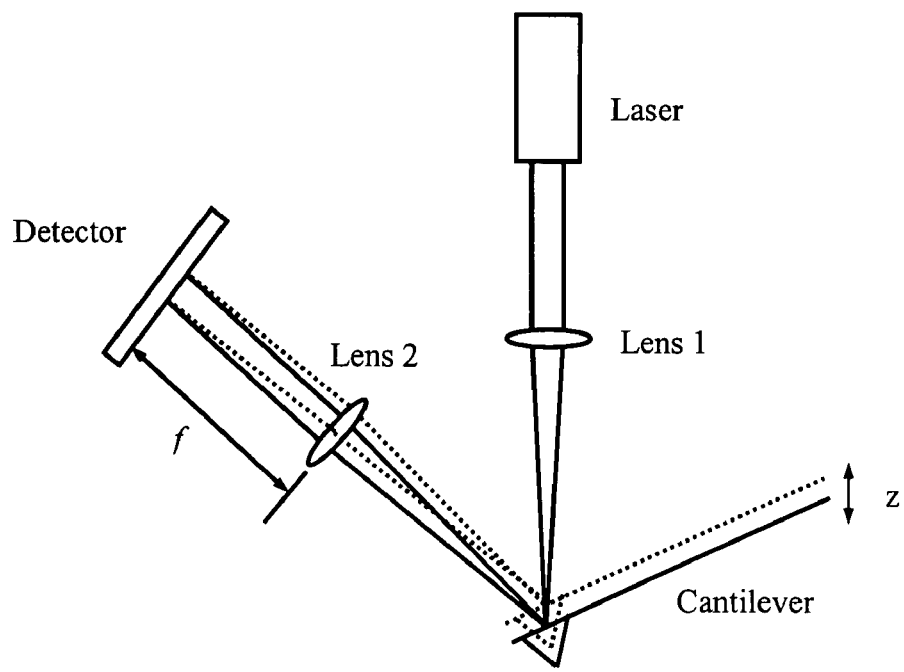
FIG. 4 shows an embodiment of an AFGM sensor, and illustrates the minimal impact of linear oscillation in z on the position of laser beam on the detector.

The sensor in the AFGM is sensitive to the bending of the cantilever as a result of tip-sample interaction, but is substantially unaffected by linear Z oscillations. FIG. 4 shows an example of such a sensor, comprising a laser that radiates a beam for detecting the bending of the cantilever, lens 1 that focuses the beam on the cantilever, lens 2 that collects reflected light from the cantilever, and a detector for detecting the position of the reflected light. The detector is located at or near the rear focal plane of lens 2 so that the position of the laser beam on the detector is not affected by the oscillation of the cantilever in z direction. Only the bending of the cantilever causes change in the position of the beam. As a result, the output signal from the detector is representative of interaction force between the tip and sample. In some cases, if the angle between the incident light and the reflected light from the cantilever is small enough, the shift of the light due to z oscillation may be negligible and lens 2 may be omitted. In addition to the optical technique, self-sensing cantilevers that sense the bending using strain gauges as described in U.S. Pat. No. 6,148,662, or piezoresistive effect as described in U.S. Pat. No. 5,345,815, can also isolate the bending of the cantilever from linear motion of the probe, and can also be used as the sensor for this invention.

As aforementioned, the probe is oscillated at a frequency lower than its resonance. In addition to linear motion due to the oscillation, the cantilever also bends due to the interaction between tip and sample. The bending is measured by aforementioned sensor. The sensor output is then sent to measuring electronics, which convert the output into a force for force mapping and a force gradient signal. The force gradient signal is sent to the controller, which generates a control signal according to the difference between the force gradient and "set point" input by a user. The control signal adjusts the distance between tip and sample through z stage so that the force gradient signal follows the set point, i.e. the tip tracks the sample surface. With force gradient signal used for feedback, topography and force can be mapped concurrently using the control signal and force signal, respectively.

Figure 5:
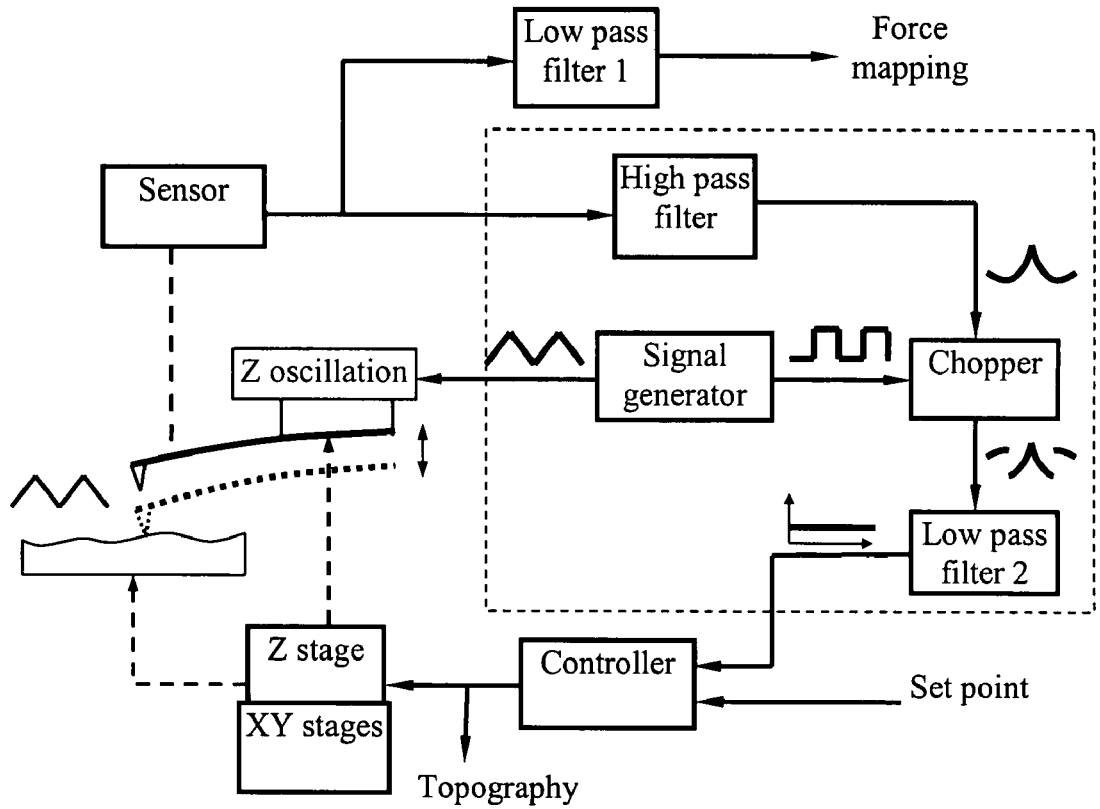
FIG. 5 shows a first preferred AFGM embodiment.

FIG. 5 shows a first preferred embodiment. Inside the dashed rectangular box are the electronics for measuring atomic force gradient. A signal generator generates two signals: a triangular wave and a square wave, both of which are of the same high frequency but below the resonant frequency of the cantilever. This frequency range may be a few hundred Hertz to a few hundreds of thousands Hertz. The triangular signal drives z oscillation mechanism, usually a piezoelectric actuator, to oscillate the probe in z direction. The amplitude of oscillation is usually in the range of less than an angstrom to 10 nanometers, depending on the shape of force curves. Since the driving frequency is below the resonant frequency of the cantilever, the tip generally follows the linear motion of the actuator.

Figure 6:
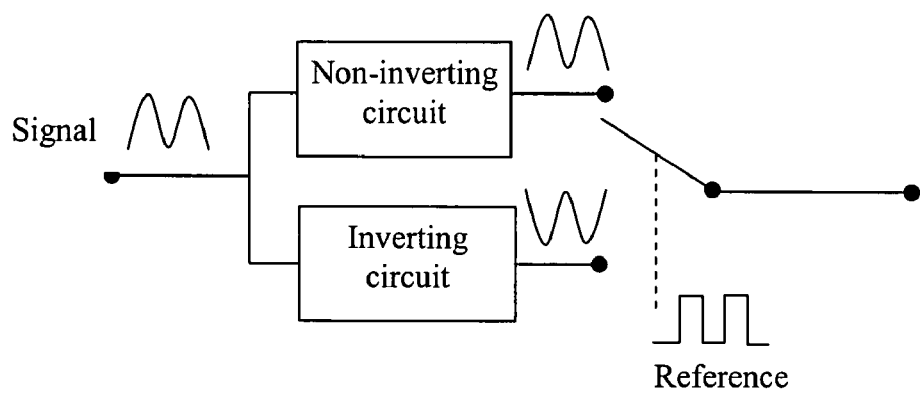
FIG. 6 provides a schematic of an electronic chopper including inverting and non-inverting circuits and a switch.

If the tip enters the atomic force region of the sample, the cantilever also bends in response to the tip-sample interaction force in addition to the linear motion. The bending is sensed by the aforementioned sensor, which outputs a signal representative of the interaction force. The shape of the sensor signal resembles the force curve in the region where the tip is modulated. The sensor signal is then sent to low pass filter 1 and the high pass filter. Low pass filter 1 suppresses Z oscillation-related high-frequency components, generating a smoothed signal that is indicative of average force over the region where the tip is oscillated. This signal is referred to as force signal. The high pass filter blocks the sensor signal's DC component and lets other components pass. After passing the filter, the signal goes to an electronic chopper. The chopper consists of inverting and non-inverting circuits and a switch, as shown in FIG. 6. The switch is controlled by a reference signal, which alternately connects the non-inverting and inverting signal to the output. The reference signal in FIG. 5, is the square wave from the signal generator. The output from the chopper is smoothed by low-pass filter 2, the output of which is representative of the average force gradient over the region where the tip is oscillated. More details on how the electronic chopper works will be explained in the following paragraph. The gradient signal from low pass filter 2 is then sent to a controller, which generates a control signal to adjust the position of the sample or tip through Z stage according to the difference between gradient signal and user input "set point". The control signal, which is indicative of the topography of the sample, and aforementioned smoothed force signal can be used for topography and force mapping, respectively, when force gradient signals are used for feedback control to keep the tip tracking the surface as the sample or tip is scanned in X and Y directions by XY stages.

Figure 7:
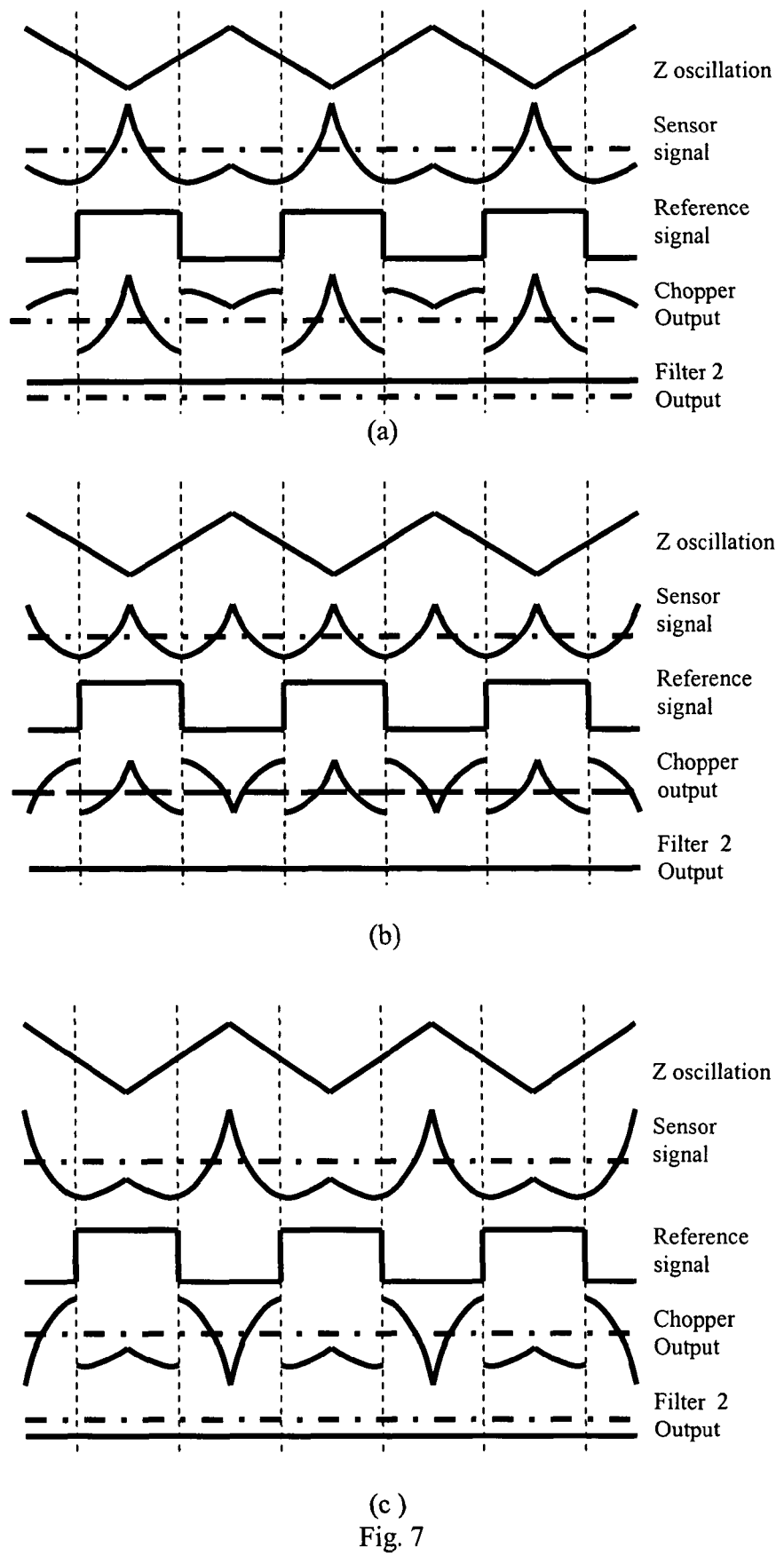
FIG. 7 shows extraction of force gradient from a sensor signal for positive, zero and negative force gradients, respectively.

FIG. 7 shows the details on how force gradient is extracted from the sensor signal for positive, zero and negative force gradients, respectively. For all of these gradients, the tip is oscillated in the bottom region of the atomic force curve as shown in FIG. 2. For positive average gradients, the tip is modulated around the bottom with its center shifted on the left side of the force curve bottom, as shown in FIG. 7(*a*). For zero average gradients, the tip is oscillated approximately symmetrically around the bottom, as shown in FIG. 7(*b*). For negative gradients, the center of oscillation shifts to the right side of the bottom, as shown in FIG. 7(*c*). The sensor signals in FIGS. 7(*a*), (*b*) and (*c*) resemble the force curve in the region where the tip is oscillated. The electronic chopper permits the sensor signal to pass when reference square wave is "1", and reverses the signal when the reference is "0". The output is smoothed by low pass filter 2. The combination of the electronic chopper and the filter fulfills the function of subtracting one portion of the force signal from the other electronically. The phase of the reference signal can be adjusted so that the subtraction happens between signal segments obtained at different tip-sample distance. In this way, the electronics convert positive average gradient to positive output, zero gradient to zero output, and negative gradient to negative output. The steeper the force-distance curve, the bigger the output. The subtraction result is representative of the average force gradient over the region where the tip is oscillated.

Figure 8:
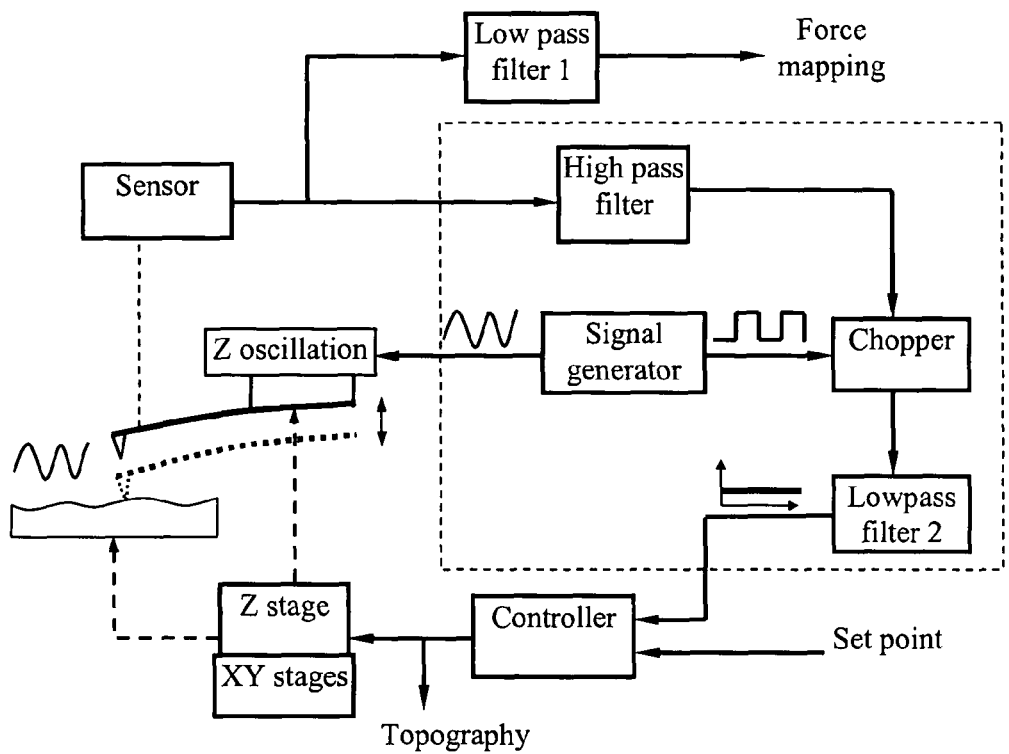
FIG. 8 shows a second preferred embodiment of an AFGM, which is the same as the first embodiment except that the signal generator generates a sinusoidal and a square wave instead of a triangular and a square wave.

The second preferred embodiment of this invention, as shown in FIG. 8, is the same as the first one except that the signal generator generates a sinusoidal wave and a square wave instead of a triangular wave and a square wave. The sinusoidal wave drives the oscillation of the cantilever. Since a sinusoidal wave does not have higher harmonics, the cantilever follows better the driving signal. Unlike a triangular wave, a sinusoidal wave drives the tip at different speeds in different positions, and the magnitude of the force gradient signal at low pass filter 2 in FIG. 8 will be slightly different from that of FIG. 5, as is the force signal at low pass filter 1.

Figure 9:
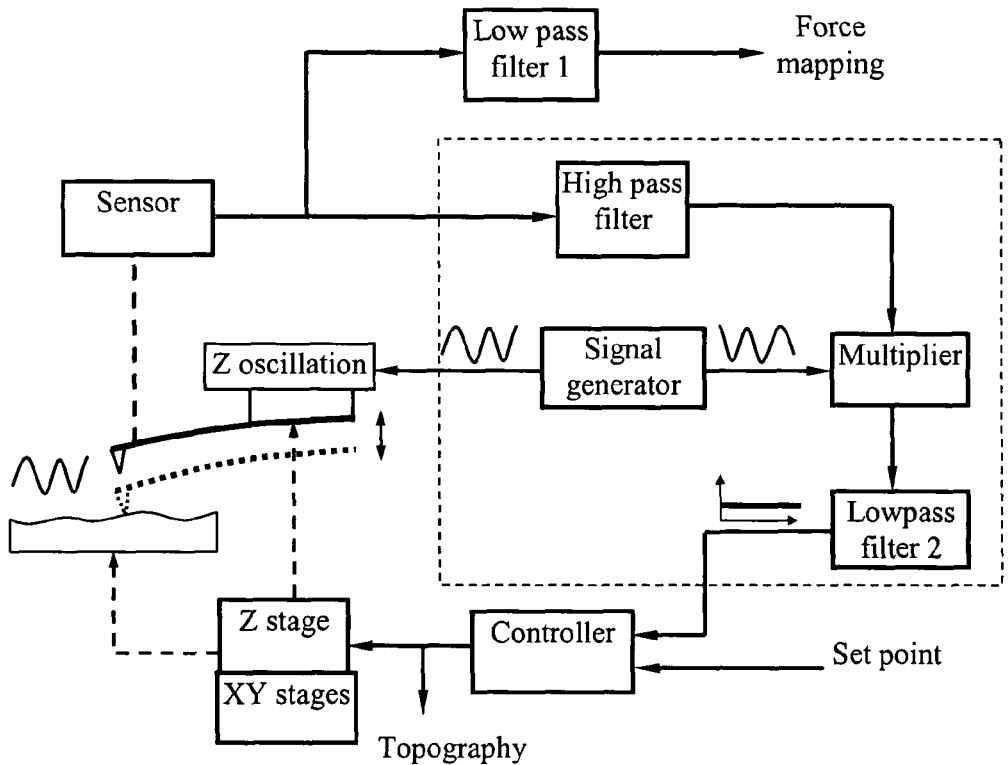
FIG. 9 shows a third embodiment of an AFGM, in which the signal generator generates two sinusoidal waves.

In the third preferred embodiment of this invention, as shown in FIG. 9, the signal generator generates two sinusoidal waves. One of these sinusoidal waves drives the oscillation of the probe cantilever. The bending of the cantilever is sensed by the aforementioned sensor. The sensor signal is then sent to low pass filter 1 and a high pass filter. Low pass filter 1 suppresses Z oscillation-related high-frequency components, generating a smoothed force signal that is indicative of average force over the region where the tip is oscillated. The high pass filter blocks the sensor signal's DC component and lets other components pass. After passing the filter, the signal is sent to a multiplier together with the other sinusoidal wave from the signal generator. The output from the multiplier is smoothed by low-pass filter 2. The output of the filter is representative of the average force gradient over the region where the probe is modulated. Compared to the first and second preferred embodiments, a multiplier is used here instead of an electronic chopper. In fact, an electronic chopper may also be considered as a multiplier except that it requires one of its inputs to be a square wave. A multiplier can be considered as a generalized electronic chopper. The magnitude of force gradient in this embodiment is slightly different from that of the first and second embodiments. The gradient signal is then sent to a controller. The controller generates a control signal to adjust the position of the z stage so that the force gradient signal follows the value of the "set point" input by a user. Similar to the first and second embodiments, the control signal, which is indicative of the topography of the sample, and the aforementioned average force signal are used for topography and force mapping, respectively, when the force gradient signal is used for feedback control to keep the tip tracking the surface as the sample or the tip is scanned in X and Y directions by XY stages.

In addition to above preferred embodiments, there are many variations. For example, the sinusoidal or triangular waves from signal generator to Z oscillation in FIGS. 5, 8 and 9 may be replaced with any other periodical signal. As a result of this change, the magnitude of force gradient signal may be affected slightly, but the functioning of AFGM is likely not affected. The reference signals in FIGS. 5 and 8 can be any other periodical waves instead of square-wave and the periodical wave may be converted to a square wave by an additional circuit, which can be stand-alone or integrated as part of the electronic chopper circuit. The signal from the signal generator to the multiplier in FIG. 9 can also be any periodical wave instead of a sinusoidal wave since the multiplier can generally take any signal as its input. These variations may cause a slight change in the magnitude of the gradient signal. Other variations include eliminating the high pass filter in FIGS. 5, 8 and 9, adding gain and phase shift circuits in the schematic, which may or may not affect the normal functioning of the circuits. It is also possible to fulfill some or all of above function in FIGS. 5, 8 and 9 using a digital controller.

A distinctive feature of AFGM is its force mapping capability. One application of this feature is to map chemical distribution on a surface, which is also referred to as chemical mapping. This is realized by mapping the onset chemical bonding force formed between a probing tip and surface atoms. Since different chemicals possess different atomic composition, the bonding force formed between a tip and surface atoms is chemical-dependent, so is the onset bonding force. To map the force, the tip of a probe is placed at the position where chemical bonding is about to form by keeping the force gradient constant at proper value through a feedback. The onset force, representative of chemical composition, is recorded in relation to lateral position as the tip is scanned over the surface.

Another application of force mapping is to map magnetic force distribution. This is realized by positioning a probe in non-contact region, e.g. zone 2 in FIG. 2, using force gradient feedback. Magnetic force is recorded in relation to XY position as the tip is scanned over sample surface. In this way, magnetic force is mapped in just one scan regardless of the surface roughness.

AFGM can also be used to image biological samples in liquid. Since the cantilever is oscillated off resonant frequency, it is minimally affected by the damping effect of liquid, and there is no need to search for the resonant frequency, making the operation of AFGM in liquid as easy as in air.

The invention claimed is:

1. A method of operating a scanning probe microscope including a probe having a cantilever and a probe tip mounted on one end of the cantilever, comprising scanning said tip across the surface of a sample and data representative of the surface of the sample is collected in relation to the position of the tip as the tip is scanned, the method comprising:

Oscillating the probe at a frequency lower than the first resonant frequency region of the cantilever as defined by Full Width at Half Maximum during said scanning;

producing a force signal from said scanning that is indicative of the interaction force between the tip and sample by sensing the bending of the cantilever; and producing a force gradient signal from said force signal.

2. The method according to claim 1, wherein the force signal is produced using a detector to detect the position of a laser beam reflected from the cantilever.

3. The method according to claim 2, providing a lens between said detector and the cantilever, and locating the detector at or near the focal plane of the lens.

4. The method according to claim 1, wherein the force signal is produced by detecting the change in electrical resistance of a self-sensing cantilever.

5. The method according to claim 1, wherein the force gradient signal is produced by subtracting a segment of the force signal obtained at a first tip-sample distance from another segment obtained at a second tip-sample distance.

6. The method according to claim 1, wherein the force gradient signal is produced by multiplying the force signal by a reference signal at the same frequency.

7. The method according to claim 1, wherein the force gradient signal is kept substantially constant through a feedback and collecting the feedback control signal to characterize the topography of the sample.

8. The method according to claim 1, wherein the force signal is collected to characterize the surface of a sample, and the force gradient signal is kept substantially constant through a closed-loop feedback.

9. The method according to claim 8, wherein the force signal is a measure of chemical bonding force formed between the tip and the sample.

10. The method according to claim 8, wherein the force signal is a measure of magnetic force between the tip and the sample.

11. The method according to claim 1, wherein the tip of a probe is scanned at close proximity to the sample without using feedback, and a the force gradient signal is collected to characterize the sample surface.

12. The method according to claim 1, wherein a layer of liquid is provided on the surface of the sample with a depth to cover said the probe.

13. A scanning probe microscope (SPM) wherein a probe with a tip mounted on the end of a cantilever arm is scanned across the surface of a sample and data reflecting the characteristics of the sample surface are gathered as a function of the position of the probe tip, comprising:

An oscillating means to oscillate the probe at a frequency below the first resonant frequency region of the cantilever as defined by Full Width at Half Maximum;

a force sensor that is sensitive to the bending of the cantilever, and minimally sensitive to oscillation; and means for converting the signal from said force sensor to a force gradient signal.

14. The force sensor according to claim 13, comprising:

A laser that delivers a beam onto a desired place on the cantilever, a lens that collect the reflected beam from the cantilever, and a detector located at the focal plane of said lens for detecting the position of the laser beam.

15. The force sensor according to claim 13, comprising:

A lever that converts the bending of the cantilever into change in electrical resistance, and means for measuring the change in electrical resistance.

16. The SPM according to claim 13, comprising:

Means for producing force gradient signal by subtracting a segment of the force sensor signal obtained at a first tip-sample distance from another segment obtained at a second tip-sample distance.

17. The SPM according to claim 13, further comprising:
Feedback means to keep the force gradient signal substantially constant while the control signal representative of the topography is collected to characterize the surface of a sample.

18. The SPM according to claim 13, further comprising:
Feedback means to keep the force gradient signal substantially constant while the force sensor signal is collected to characterize the surface of a sample.

19. The SPM according to claim 13, comprising:
Means to scan the tip in close proximity to the surface of the sample without using feedback, and collecting the force gradient signal to characterize the surface of a sample.

20. A scanning probe microscope (SPM) wherein a probe with a tip mounted on the end of a cantilever arm is scanned across the surface of a sample and data reflecting the characteristics of the sample surface are gathered as a function of the position of the probe tip, comprising:
An oscillating means to oscillate the probe at a frequency lower than the resonant frequency of the cantilever;
a force sensor that is sensitive to the bending of the cantilever, and minimally sensitive to oscillation;
means for converting the signal from said force sensor to a force gradient signal; and
means for producing a force gradient signal by multiplying the force sensor signal by a reference signal at the same frequency.

\* \* \* \* \*